(12) United States Patent  (10) Patent No.: US 6,702,940 B2
Blange  (45) Date of Patent: Mar. 9, 2004

(54) DEVICE FOR TRANSPORTING PARTICLES OF MAGNETIC MATERIAL

(75) Inventor: Jan Jette Blange, Rijswijk (NL)

(73) Assignee: Shell Oil Company, Houston, TX (US)

( * ) Notice: Subject to any disclaimer, the term of this patent is extended or adjusted under 35 U.S.C. 154(b) by 66 days.

(21) Appl. No.: 09/981,605

(22) Filed: Oct. 16, 2001

(65) Prior Publication Data

US 2002/0079998 A1 Jun. 27, 2002

(51) Int. Cl.$^7$ .............. E21B 43/114; H01F 7/02
(52) U.S. Cl. .......... 210/222; 209/219; 209/226; 209/227; 209/231; 175/67; 175/393; 451/87
(58) Field of Search ................. 210/222, 695; 209/219, 226, 227, 231; 175/67, 393; 451/87; 335/302

(56) References Cited

U.S. PATENT DOCUMENTS 3,508,621 A * 4/1970 Gaylord et al. ............ 175/67
4,055,489 A * 10/1977 Soley .................... 209/226
6,510,907 B1 * 1/2003 Blange ................... 175/67

* cited by examiner

Primary Examiner—David A. Reifsnyder

(57) ABSTRACT

A device for transporting particles of a magnetic material in a selected direction, having a support member having a support surface for supporting the particles, the support surface extending in a selected direction, a magnet arranged to generate a magnetic field retaining the magnetic particles on the support surface, the magnetic field having at least one region of reduced field strength at the support surface relative to a field strength of the magnetic field at the support surface outside said region, and drive means for moving each region of reduced field strength relative to the support surface in a direction having a component in the selected direction.

12 Claims, 2 Drawing Sheets

DEVICE FOR TRANSPORTING PARTICLES OF MAGNETIC MATERIAL

Figure 1:
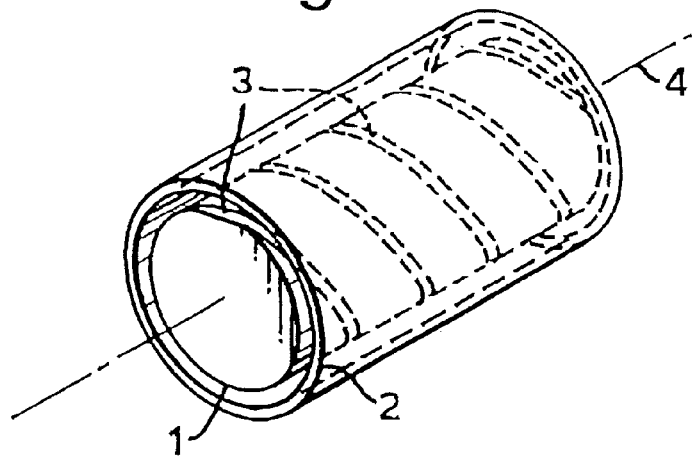

The present invention relates to a device for transporting particles of a magnetic material in a selected direction. There are various fields of technology in which it is desired to transport particles of a magnetic material, for example continuous separation of paramagnetic particles from a stream of fluid or continuous grid cleaning operations. In the description hereinafter, particles of a magnetic material are understood to be particles which are attracted by a magnet which induces a magnetic field extending into the area where the particles are present.

Accordingly it is an object of the invention to provide a device for transporting particles of a magnetic material in a selected direction.

The device according to the invention comprises:

a support member having a support surface for supporting the particles, the support surface extending in the selected direction;

a magnet arranged to generate a magnetic field retaining the magnetic particles on the support surface, the magnetic field having at least one region of reduced field strength at the support surface relative to a field strength of the magnetic field at the support surface outside said region; and drive means for moving each region of reduced field strength relative to the support surface in a direction having a component in the selected direction.

It is thereby achieved that, when particles of a magnetic material are supplied to the support surface, the magnetic forces exerted to the particles are lower at the region of reduced field strength than outside said region. Thus, the particles tend to adhere stronger to the surface outside said region than in said region, and by moving the region of reduced field strength relative to the support surface, the particles tend to follow such movement. The magnetic material can be, for example, a material having ferromagnetic, ferrimagnetic or paramagnetic properties.

In an attractive embodiment of the invention said particles are abrasive particles and the device forms part of a tool for excavating an object, the tool including a jetting system having a mixing chamber provided with a first inlet for a fluid, a second inlet for abrasive particles and an outlet nozzle arranged to jet a stream of fluid and abrasive particles against the object during excavating the object with the tool, and wherein the device is arranged so that the support surface is exposed to said stream downstream impingement of the stream against the object and that the particles are transported by the device towards said second inlet.

Suitably the tool forms a drilling tool for drilling a borehole in an earth formation, and wherein the object forms the wall or the bottom of the borehole.

Alternatively the tool forms a milling tool for milling an opening in a wellbore tubular, and wherein the object forms the wall of the wellbore tubular.

It is preferred that the stream flows along the device (downstream impingement against the object) through a conduit of non-magnetic material.

Figure 2:
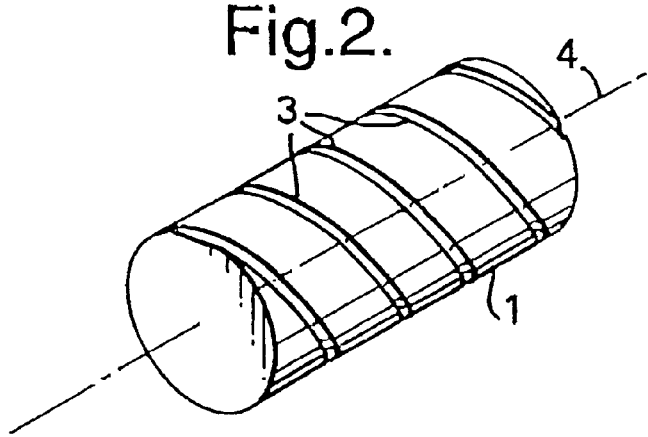
Figure 3:
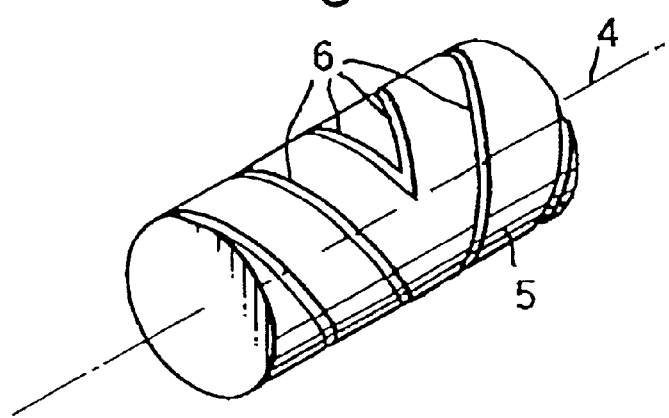
Figure 4:
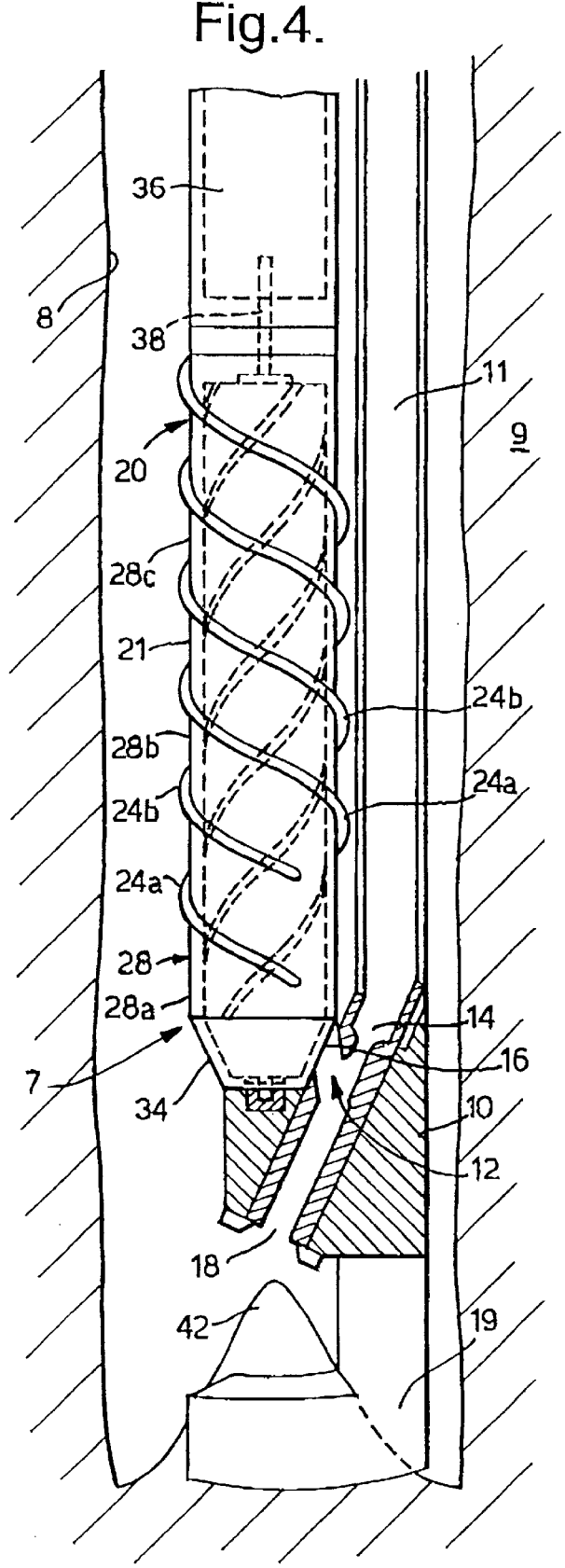
Figure 5:
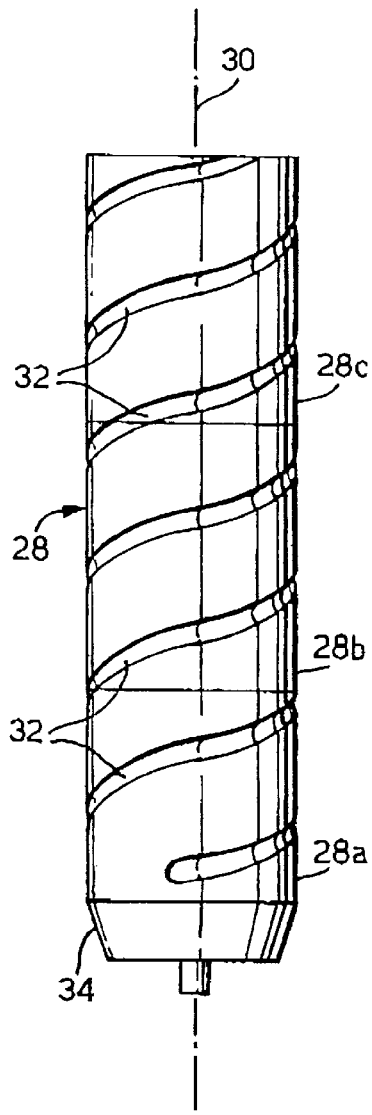

The invention will be described hereinafter in more detail and by way of example, with reference to the accompanying drawings in which:

FIG. 1 schematically shows a perspective view of an embodiment of the device of the invention;

FIG. 2 schematically shows a magnet used in the embodiment of FIG. 1;

FIG. 3 schematically shows an alternative magnet used in the embodiment of FIG. 1;

FIG. 4 schematically shows a side view, partially in cross-section, of a drilling tool in which the device of the invention is incorporated; and FIG. 5 schematically shows an assembly of magnets used in the embodiment of FIG. 1.

In the Figures like reference numerals relate to like components.

In FIG. 1 is shown a cylindrical magnet 1 concentrically arranged in a cylindrical sleeve 2. The magnet 1 is at its outer surface provided with a number of helical grooves 3. The magnet 1 has a central longitudinal axis 4 about which the magnet 1 is rotatable relative to the sleeve 2. The spacing between the magnet 1 and the sleeve 2 is smaller than the width of each groove 3.

In FIG. 2 the magnet 1 is shown when removed from the sleeve 2.

In FIG. 3 is shown an alternative magnet 5 for application in sleeve 2, which magnet 5 is largely similar to the magnet 1, except that the magnet 5 has helical grooves 6 which change helical orientation at the axial centre of the sleeve. Similarly to the magnet 1, the magnet 5 is rotatable relative to the sleeve 2 about the longitudinal axis 4.

Referring to FIG. 4 there is shown a drilling tool 7 connected to the lower end of a drill string (not shown) extending into a borehole 8 formed in an earth formation 9. The drilling tool includes an elongate housing 10 having a longitudinal drilling fluid passage 11 at one end thereof in fluid communication with a drilling fluid channel provided in the drill string and at the other end thereof in fluid communication with a mixing chamber 12 via a drilling fluid inlet 14. The mixing chamber is in fluid communication with an inlet for abrasive particles 16 and with an outlet nozzle 18 arranged to jet a stream of drilling fluid and abrasive particles against the earth formation 9 during drilling with the drilling tool 7 in the borehole 8. The outlet nozzle is arranged inclined relative to the longitudinal direction of the drilling tool at an inclination angle of 15–30° relative to vertical, preferably about 21°. The lower end of the housing 10 is provided with a support leg 19 for supporting the drilling tool 7 on the bottom of the borehole 8.

A cylindrical device 20 for transporting abrasive particles is connected to the housing 9 and extends substantially parallel to the drilling fluid passage 11. The device 20 includes a cylindrical sleeve 21 fixedly arranged relative to the housing 10 and provided with guide members in the form of two plates 24a, 24b of non-magnetic material arranged in a helical arrangement around the sleeve 21. The plate 24a has a lower end arranged near the inlet 16 for abrasive particles.

Referring also to FIG. 5 a cylindrical magnet 28 formed of three smaller magnets 28a, 28b, 28c stacked together, is concentrically arranged within the sleeve 21. The magnet 28 has a central longitudinal axis 30 and is rotatable relative to the sleeve 21 about the central longitudinal axis 30. Each magnet 28a, 28b, 28c has diametrically opposed N and S poles, and the magnets are stacked in a manner that adjacent magnets have oppositely oriented N-S directions. A number of helical grooves 32 is provided in the outer surface of the magnet 28 (in FIG. 1 the magnet 28 and the grooves 32 are partially shown in phantom lines). The helical orientation of the grooves 32 is opposite to the helical orientation of the plates 24a, 24b. A short tapered section 34 is provided at the lower end of magnet 28a in a manner that the inlet 16 for abrasive particles provides fluid communication between the outer surface of the tapered section 34 and the mixing chamber 12. An electric motor 36 for rotating the magnet 28 is arranged above the magnet 28 and connected thereto via a drive shaft 38, which motor 36 is controlled by a control system (not shown) at surface via an electric wire (not shown) extending through the drill string. Alternatively the motor can be controlled by a wireless control system provided with a battery package.

During normal use of the device shown in FIG. 1, the magnet 1 induces a magnetic field which extends to the outer surface of the sleeve 2. Due to the higher magnetic permeability of the magnet material than the less magnetic material (gas, fluid or solid) in the grooves 3, the magnetic field lines tend to follow the material of the magnet rather than the material in the grooves 3. As a result the magnetic field strength is lower at sections of the sleeve 2 which are located opposite the grooves 3 than at sections located opposite the magnet material in-between the grooves 3.

A motor (not shown) rotates the magnet 1 about its longitudinal axis 4 relative to the sleeve 2, and simultaneously particles of a magnetic material are supplied to the outer surface of the sleeve 2. The particles are attracted to said outer surface by the magnetic forces from the magnet 1, whereby such forces are lower at the sections opposite the grooves 3 than at the sections opposite the magnet material in-between the grooves where the field strength is higher. Due to rotation of the magnet the respective sections of lower and higher magnetic forces move in axial direction along the sleeve 2, thereby forcing the particles to follow such axial movement. In this manner the particles are transported towards one end of the magnet.

Normal use of the alternative magnet 5 of FIG. 3 is similar to normal use of the magnet of FIG. 1, except that the particles are transported by the magnetic forces towards the axial centre of the sleeve, or away from the centre depending on the rotation direction of the magnet, by virtue of the grooves changing helical orientation at the centre of the sleeve. Obviously the axial location at which the helical grooves change orientation can be varied in accordance with the required location to which, or from which, the particles are to be transported.

During normal use of the drilling tool of FIGS. 4, 5 a stream of drilling fluid is pumped by a suitable pump (not shown) at surface, via the fluid channel of the drill string and the fluid passage 11 into the mixing chamber 12. During initial pumping, the stream is provided with a batch of abrasive particles of magnetic material such as steel shot or steel grid. The stream flows from the mixing chamber 12 into the outlet nozzle 18 and is thereby jetted against the borehole bottom (indicated by reference sign 40). Simultaneously the drill string is rotated so that the borehole bottom is evenly eroded whereby, due to the inclined orientation of the outlet nozzle 18, the borehole bottom 40 has a heap-shaped central part 42. The stream of fluid and abrasive particles flows from the borehole bottom 40 through the borehole 8 in upward direction and thereby passes along the sleeve 21.

Simultaneously with pumping of the stream of drilling fluid, the motor 36 is operated so as to rotate the magnet 28 via the drive shaft 38 in left-hand direction (when seen from the top of the drill string). Similarly to the embodiment of FIGS. 1–3, the magnet 28 induces a magnetic field which extends to the outer surface of the sleeve 21. Due to the higher magnetic permeability of the magnet material than the material (or vacuum) in the grooves 32, the magnetic field lines tend to follow the material of the magnet thereof rather than the air in the grooves 32. As a result he magnetic field strength is lower at sections of the sleeve 21 which are located opposite the grooves 32 than at sections located opposite the magnet material in-between the grooves 32.

As the stream passes along the sleeve 21, the abrasive particles in the stream are separated out from the stream by the magnetic forces from the magnet 28 which attract the particles onto the outer surface of the sleeve 21. The stream of drilling fluid, which is now substantially free from abrasive particles, flows further through the borehole 8 to the pump at surface and is re-circulated through the drill string after removal of the drill cuttings.

The magnetic forces exerted to the abrasive particles are lower at the sections opposite the grooves 32 than at the sections opposite the magnet material in-between the grooves 32 where the field strength is higher. Due to rotation of the magnet 28 the respective sections of lower and higher magnetic forces move in downward direction, thereby forcing the particles to follow such downward movement. The plates 24a, 24b guide the particles in a downwardly spiralling movement along the outer surface of the sleeve 21. As the particles arrive at the inlet 16, the stream of drilling fluid flowing into the mixing chamber 12 again entrains the particles. In a next cycle the abrasive particles are again jetted against the borehole bottom and subsequently flow in upward direction through the borehole. The cycle is then repeated continuously. In this manner it is achieved the drill string/pumping equipment is substantially free from damage by the abrasive particles as these circulate through the lower part of the drill string only, while the drilling fluid circulates through the entire drill string and pumping equipment. In case a small fraction of the particles flows through the borehole to surface, such fraction can again be inserted via the stream of fluid flowing through the drill string.

Instead of the grooves of the magnetic containing a gas, fluid or solid, there can be vacuum in the grooves.

While the present invention has been described in terms of various embodiments, modifications in the apparatus and techniques described herein without departing from the concept of the present invention. It should be understood that the embodiments and techniques described in the foregoing are illustrative and are not intended to operate as a limitation on the scope of the invention.

What is claimed is:

1. A device for transporting particles of a magnetic material in a selected direction, the device comprising:

a support member having a support surface for supporting the particles, the support surface extending in the selected direction;

a magnet arranged to generate a magnetic field retaining the magnetic particles on the support surface, the magnetic field having at least one region of reduced field strength at the support surface relative to a field strength of the magnetic field at the support surface outside said region; and drive means for moving each region of reduced field strength relative to the support surface in a direction having a component in the selected direction.

2. The device of claim 1, wherein the magnet is a permanent magnet, and each region of reduced field strength corresponds to a region of reduced magnetic permeability in at least one of the magnet and a space between the magnet and the support surface.

3. The device of claim 2, wherein each region of reduced field strength corresponds to a recess provided in the outer surface of the magnet.

4. The device of claim 3, wherein the magnet is substantially cylindrical and each recess is formed by a helical groove provided in the magnet.

5. The device of claim 4, comprising a first said helical groove extending between a selected axial position at the magnet and one end of the cylindrical magnet, and a second said helical groove extending between the selected axial position and the other end of the cylindrical magnet, said helical grooves having opposite orientations.

6. The device of claim 5, wherein the support member forms a substantially cylindrical sleeve concentrically arranged around the magnet.

7. The device of claim 6, wherein the drive means includes a motor for rotating the magnet about its central longitudinal axis relative to the sleeve.

8. The device of claim 7, wherein the sleeve is provided with a guide surface extending in a helical shape around the sleeve and being oppositely oriented relative to the orientation of the helical groove opposite the guide surface.

9. The device of claim 8, wherein said particles are abrasive particles and the device forms part of a tool for excavating an object, the tool including a jetting system having a mixing chamber provided with a first inlet for a fluid, a second inlet for abrasive particles and an outlet nozzle arranged to jet a stream of fluid and abrasive particles against the object during excavating the object with the tool, and wherein the device is arranged so that the support surface is exposed to said stream downstream impingement of the stream against the object and that the particles are transported by the device towards said second inlet.

10. The device of claim 9, wherein the tool forms a drilling tool for drilling a borehole in an earth formation, and wherein the object forms the wall or the bottom of the borehole.

11. The device of claim 9, wherein the tool forms a milling tool for milling an opening in a wellbore tubular, and wherein the object forms the wall of the wellbore tubular.

12. The device of claim 11, wherein the device is arranged so that the central longitudinal axis of the sleeve extends substantially in longitudinal direction of the borehole during operation of the tool in the borehole.

* * * * *